United States Patent
Seo et al.

(10) Patent No.: US 6,247,088 B1
(45) Date of Patent: Jun. 12, 2001

(54) BRIDGELESS EMBEDDED PCI COMPUTER SYSTEM USING SYNCRONOUS DYNAMIC RAM ARCHITECTURE

(75) Inventors: Toshio Seo, Roswell, GA (US); Jason Eric Waldeck, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/074,811

(22) Filed: May 8, 1998

(51) Int. Cl.⁷ .................................................... G06F 13/38
(52) U.S. Cl. ................................ 710/129; 710/1; 710/62
(58) Field of Search .................................. 710/126–130, 710/1–2, 62–64

(56) References Cited

U.S. PATENT DOCUMENTS

| | | | | |
|---|---|---|---|---|
| 5,250,940 | * | 10/1993 | Valentaten et al. | 345/189 |
| 5,369,744 | * | 11/1994 | Fukushima et al. | 710/113 |
| 5,434,996 |   | 7/1995 | Bell | 395/550 |
| 5,528,764 | * | 6/1996 | Heil | 710/113 |
| 5,553,220 | * | 9/1996 | Keene | 395/520 |
| 5,581,714 |   | 12/1996 | Amini et al. | 395/308 |
| 5,627,650 | * | 5/1997 | Nosaki et al. | 358/296 |
| 5,630,096 |   | 5/1997 | Zuravleff et al. | 395/481 |
| 5,632,021 |   | 5/1997 | Jennings et al. | 395/309 |
| 5,634,107 | * | 5/1997 | Yumoto et al. | 711/111 |
| 5,636,173 |   | 6/1997 | Schaefer | 365/230.03 |
| 5,655,142 | * | 8/1997 | Gephardt et al. | 712/32 |
| 5,666,321 |   | 9/1997 | Schaefer | 365/233.5 |
| 5,732,224 | * | 3/1998 | Gulick et al. | 710/100 |
| 5,752,075 | * | 5/1998 | Kikinis | 710/1 |
| 5,799,202 | * | 8/1998 | Rongione | 712/1 |
| 5,809,038 | * | 9/1998 | Martin | 714/719 |
| 5,859,711 | * | 1/1999 | Barry et al. | 358/296 |
| 5,883,814 | * | 3/1999 | Luk et al. | 395/500.09 |
| 5,884,050 | * | 3/1999 | Wheeler et al. | 710/107 |
| 5,900,885 | * | 5/1999 | Stortz | 345/508 |
| 5,903,775 | * | 5/1999 | Murray | 375/220 |
| 5,911,049 | * | 6/1999 | Watanabe | 710/100 |
| 5,917,505 | * | 6/1999 | Larson | 345/522 |
| 5,923,829 | * | 7/1999 | Ishii et al. | 365/227 |
| 5,936,635 | * | 8/1999 | Larson et al. | 345/441 |
| 5,941,968 | * | 8/1999 | Mergard et al. | 710/128 |

\* cited by examiner

Primary Examiner—Sumati Lefkowitz
(74) Attorney, Agent, or Firm—Frederick H. Gribbell; D. Brent Lambert

(57) ABSTRACT

An improved computing system is provided that includes an embedded PCI device without the use of a PCI bridge to isolate the PCI device from the CPU and the system memory devices. This is accomplished by use of synchronous dynamic RAM (SDRAM) as the main memory device for the CPU, and by providing a PCI/SDRAM logic circuit to control the interfacing of the data and control signals between the PCI device, CPU, and SDRAM device. A combined PCI/Host data bus is provided that connects all of the major system components, including the SDRAM device, the CPU, the PCI device(s), and the PCI/SDRAM logic circuit, thereby eliminating the use of two separate buses found in conventional personal computers. By use of the synchronous DRAM, the present invention provides a much more efficient memory system for interfacing with PCI devices, and thereby dramatically increases the memory bandwidth as compared to conventional computing systems that use asynchronous DRAM.

24 Claims, 7 Drawing Sheets

BRIDGELESS EMBEDDED PCI COMPUTER SYSTEM USING SYNCRONOUS DYNAMIC RAM ARCHITECTURE

TECHNICAL FIELD

The present invention relates generally to computer equipment and is particularly directed to computers of the type which provide one or more embedded PCI devices. The invention is specifically disclosed as a laser printer that eliminates the need for a PCI bridge circuit while using synchronous dynamic RAM for the system memory.

BACKGROUND OF THE INVENTION

Peripheral Component Interconnect (PCI) devices have become very important to embedded system architects. PCI allows designers to take advantage of the availability and pricing of chipsets mass-produced for the PC (personal computer) market. The high-performance aspects of this architecture impose demanding hardware requirements for efficient use. Due to the relatively slow nature of accesses to dynamic random-access memory (DRAM), it is usually necessary to implement a temporary storage device—such as a first-in first-out buffer (FIFO)—in silicon to buffer the accesses to system memory. This results in higher system cost due to complexity (increased number of logic gates) and input-output (increased number of device pins) requirements.

Faster DRAM and the use of greater clock speeds is a potential solution to increasing the performance of a microprocessor-based computing system, however, there are limits to the effectiveness of this type of solution. For one thing, in conventional PC systems that use PCI devices, an increase in processing speed at the main CPU (i.e., the microprocessor) and at its RAM and ROM (read only memory) devices does not necessarily help to increase the throughput of the PCI device/main CPU sub-system. This is so because the PCI devices operate at one clock rate in conventional systems, and the CPU and its memory devices operate at a second (typically faster) clock rate. The bus systems used by the PCI devices are isolated from the CPU bus systems (especially the data busses) by a "PCI bridge" circuit.

In conventional circuits that use embedded PCI devices, one common implementation provides a "CPU bus" that connects the CPU, its memory devices, and one side of the PCI bridge circuit. A second bus, the "PCI bus," is used to connect one or more PCI devices to the other side of the PCI bridge circuit. In a second common implementation of an embedded PCI system, a "CPU bus" is provided to connect the CPU to one side of the PCI bridge circuit, and a second bus, the "Memory bus," is provided to connect the memory devices to a second side of the PCI bridge circuit. A third bus, the "PCI bus," is used to connect one or more PCI devices to a third side of the PCI bridge circuit.

An example of a conventional PCI bridge circuit is disclosed in U.S. Pat. No. 5,632,021, which discloses a memory system that connects a primary PCI bus and a secondary PCI bus, but prevents these two PCI buses from having a "livelock" condition. Between the two PCI buses are a pair of PCI bridges, in which one bridge acts only as a target on the primary bus and as a master on the secondary bus, and the second bridge acts as a master on the primary bus and as a target on the secondary bus. A "livelock" condition occurs when the bus master on one of the buses can monopolize the bus to the exclusion of the bus masters on the other bus. This occurs because PCI bridges have a pipeline delay, in which the PCI bridge introduces one or more cycles of delay between the time a piece of data enters the bridge and the time that data emerges from the bridge.

Another conventional PCI bridge circuit is disclosed in U.S. Pat. No. 5,434,996, which describes a circuit within a bus bridge that operates in two (2) clock domains, in which one bus is a CPU bus that operates faster than a PCI bus. The circuit allows data, addresses, or other types of information to be transferred between the first and second clock domains whether or not an internal bus clock is operating in a synchronous or asynchronous mode.

A further PCI multi-bus computer system is disclosed in U.S. Pat. No. 5,581,714 for a logic system that improves bus-to-bus data transfers in a multi-bus computer system. A system bus has a slave device attached, a peripheral bus has a master device attached, and a host bridge connects the two buses. The system bus permits burst read transfers of data stored in the slave device, only if the first address corresponds to a prescribed system bus boundary. The peripheral bus (e.g., a PCI bus) is not subject to address boundary limitations, and permits burst read transfers beginning at any address. The peripheral bus includes a primary PCI bus, which then after running through a secondary PCI bridge, is connected to a secondary PCI bus and devices.

Some of the inherent limitations of the available conventional PCI circuits include (as noted above) (1) a high pin-out requirement and (2) buffering between buses. Assuming in the first instance that both the CPU and system memory have 32-bit data widths, the PCI bridge will require at least 64 pins for the datapath alone. This obviously increases pin count, which in turn increases cost. In the second instance, since the buses run at different speeds or at different bandwidths, it is necessary to buffer data in the form of FIFO's. Generally, the larger the FIFO, the better the performance. This increases design complexity and design size, thereby also increasing system cost.

In addition to the higher costs involved with convention embedded PCI systems, as noted above, such systems will always be limited in performance by lost portions of clock cycles in which major portions of the clock cycle must often be used to "wait" for data information or address information to be set up before being strobed into (or from) the microprocessor, or into (or from) a memory device such as a DRAM integrated circuit. The main reason for this inefficiency is that fact that DRAM chips are asynchronous, which creates the situation related above in which major portions of the clock cycle are spent waiting for data/address information to be set up.

The asynchronous nature of most PC computing systems does not lend itself well when attempting to communicate with a PCI device. This is so because PCI devices use bus timings that have very tight tolerances. In a PCI device, all data/address transfers are done in a single clock cycle, and further, the PCI specification allows only a 10 nsec propagation delay. In view of these requirements, the PCI bridge circuit must essentially convert signals between a relatively "loose" asynchronous memory system (having relatively "long" setup times) and a relatively "tight" synchronous system that is compatible with the PCI specifications. Obviously, a good deal of communications inefficiency will be the result of this type of system.

Since a typical application for a PCI device embedded in a PC system is to act as a network controller (such as an ETHERNET controller), it will be understood that the greater the efficiency in creating higher throughput, the more powerful the network controller. More power means greater commercial advantage for the product that can solve some of the inherent inefficiencies of the conventional PCI bridge systems.

It would be advantageous to eliminate the PCI bridge in some computer systems so that the data transfers between memory devices and PCI devices could be accomplished without the timing losses inherent in asynchronous DRAM chips used in conventional PC's. Synchronous DRAM (SDRAM), which is a higher-performance type of memory device, provides a means of solving this limitation.

An example of a synchronous DRAM integrated circuit is disclosed in U.S. Pat. No. 5,636,173 which includes two (2) banks of memory arrays. A controller can initiate in the first system clock cycle an active command to control an active operation on the first bank memory array, and at a second clock cycle can initiate a read or write command to transfer from or to the first bank memory array. In the second clock cycle, the controller also can initiate a "command" to control a precharge operation on the second bank memory array. To hide the precharging, the precharge command is issued to the bank memory array not being accessed while the bank memory array being accessed is in a burst mode.

An example of a conventional controller used with a synchronous DRAM is disclosed in U.S. Pat. No. 5,630,096, to maximize the throughput of memory requests. The controller maintains the spacing between commands to conform with the specifications for the synchronous DRAM while preventing gaps from occurring in the data slots. The controller allows memory requests and commands to be issued out of order so that the throughput may be maximized by overlapping required operations that do not specifically involve a data transfer. The controller also schedules memory request commands as closely together as possible to maximize the throughput of the memory requests within the timing constraints of the synchronous DRAM. The controller sorts memory requests that are received and, to maximize the throughput, the multiple memory requests are prioritized in a different order than the requests were received. In addition, memory requests are tagged to indicate a sending order, and conflicting memory requests are arbitrated, then queued and the arbitration process is decoded to simultaneously update schedule constraints.

A further example of a synchronous DRAM control circuit for a memory module is disclosed in U.S. Pat. No. 5,666,321, in which the control circuitry allows the memory module to operate in a mode that is partially asynchronous. Address transition detection is used to begin decoding the column-address immediately after a new column-address is present on the address bus lines, without waiting for the column-address strobe signal to synchronize with the rising or failing edge of the synchronizing clock signal. In addition, latching circuitry can be used in which a new column-address may be decoded and held without a buffer until the column-address strobe signal notifies the circuitry that the column-address is correct and is to be input into the microprocessor. This improves the access time of read and write operations in synchronous DRAM memory by up to a complete clock cycle.

OBJECTS OF THE INVENTION

Accordingly, it is a primary object of the present invention to provide an embedded PCI computing system in which the conventional PCI bridge circuit is eliminated.

It is another object of the present invention to provide an embedded PCI computing system that includes a "PCI/Host bus" that directly interfaces data lines between the system CPU, system memory in the form of synchronous dynamic RAM (SDRAM), and a PCI device, without the need for a conventional PCI bridge circuit.

It is a further object of the present invention to provide an embedded PCI computing system in which a PCI/SDRAM logic circuit is provided to translate PCI control signals to SDRAM control signals, while using a common PCI/Host bus to directly carry data signals between the system CPU, SDRAM memory circuit, and one or more PCI devices.

It is yet another object of the present invention to provide an embedded PCI computing system that includes a PCI/SDRAM logic circuit that allows multiplexed address and data signals to communicate with a PCI device on a common PCI/Host bus that also directly interfaces to data lines of the system CPU and the system's memory in the form of synchronous DRAM, in which the PCI/SDRAM logic circuit converts signals that would otherwise be connected to the SDRAM's data input/output ports into address signals that are placed on the SDRAM's address bus and which are communicated to the SDRAM's address input/output ports.

It is still another object of the present invention to provide an embedded PCI computing system that increases the memory bandwidth by synchronizing the data transfers between a PCI device, synchronous DRAM memory and the system CPU, while at the same time minimizing the pin-out sizes of the CPU and memory devices and eliminating buffering that would otherwise be required between two buses running at different speeds or different bandwidths.

It is still a further object of the present invention to provide an embedded PCI computing system that eliminates a conventional PCI bridge circuit by providing a common PCI/Host bus that runs directly between the system CPU, synchronous DRAM, and one or more PCI devices, and in which this system is used in an image forming device such as a laser printer.

Additional objects, advantages and other novel features of the invention will be set forth in part in the description that follows and in part will become apparent to those skilled in the art upon examination of the following or may be learned with the practice of the invention.

SUMMARY OF THE INVENTION

To achieve the foregoing and other objects, and in accordance with one aspect of the present invention, an improved computing system is provided that includes an embedded PCI device without the use of a PCI bridge to isolate the PCI device from the CPU (microprocessor) and the system memory devices. This is accomplished by use of synchronous dynamic RAM (SDRAM) as the main memory device for the CPU, and by providing a PCI/SDRAM logic circuit to control the interfacing of the data and control signals between the PCI device, CPU, and SDRAM device. The SDRAM device lies on a combined PCI/Host data bus. The "PCI bridge" is eliminated and essentially replaced by the PCI/SDRAM logic circuit, although the PCI/SDRAM logic circuit does not isolate the PCI device from the SDRAM and CPU data bus.

The resulting architecture is so efficient that it can achieve sustainable 100,000,000 bytes per second (100 MB/s) performance without the use of an on-board FIFO. The hardware demands of this system are so small it can be fully implemented in an ASIC, such as a small Field Programmable Gate Array (FPGA).

In a preferred embodiment described herein, the present invention is used in an image forming device such as a laser printer, and this printer provides the standard printing components such as an interpreter, rasterizer, print engine, input ports with buffers, and microprocessor (or CPU). In this preferred embodiment, the printer's main memory system comprises synchronous dynamic random access memory (SDRAM), and further comprises a PCI/Host bus that directly interfaces between the system CPU, SDRAM, and one or more PCI devices, such as a LAN controller device. In addition, the PCI/Host bus directly interfaces to a "PCI/SDRAM logic circuit" that translates PCI control signals to SDRAM control signals.

By use of the synchronous DRAM, the present invention provides a much more efficient memory system for interfacing with PCI devices, and thereby dramatically increases the memory bandwidth as compared to conventional computing systems that use asynchronous DRAM.

The use of SDRAM provides a means of eliminating the problems noted above in conventional systems. There are three characteristic of SDRAM that are exploited in the preferred embodiment of the present invention:
(1) Synchronous command operation—SDRAM devices have a clock input which determines when control lines are sampled and when data is valid on the bus. This is also true of PCI devices.
(2) High bandwidth—SDRAM devices allow high speed clocking, can accept memory writes every clock period, and can provide a read data operation every two or three clock periods.
(3) Short command setup and hold times—since commands and data are synchronized by a system clock, SDRAM devices operate with very short setup and hold times, similar to those necessary for PCI devices.

Using the principles of the present invention, the system CPU preferably comprises a standard microprocessor that connects to an address bus and a data bus, as well as the standard control lines that interface to its memory components. In addition, the PCI device preferably has the characteristics that meet the standard PCI specifications for use in personal computers as "embedded" PCI devices. In the present invention, one significant difference over conventional PCI systems is that the RAM consists of "synchronous" dynamic RAM, which also has a separate address bus and a data bus, along with control lines that interface to the CPU. The PCI device also has its standard control lines, and has its standard multiplexed address/data input/output ports.

One major new component of the present invention is a "PCI/SDRAM logic circuit" that interfaces directly with the control lines of the PCI device, the control lines of the SDRAM memory device, the address lines of the CPU and SDRAM memory device, and the data lines of the CPU and SDRAM memory devices, as well as the multiplexed address/data lines of the PCI device. This last set of multiplexed address/data lines is referred to herein as the "PCI/Host bus," which includes both addressing and data information, as well as a clock signal (which is common to all of the major components described above), and which eliminates the need for a conventional PCI bridge circuit.

One of the keys to the architecture of the present invention is the PCI/SDRAM logic circuit, which provides three simple functions:
(1) To act as the "Central Resource," arbitering requests from PCI devices for control of the PCI/Host bus.
(2) To translate PCI "Initiator" accesses that are directed to SDRAM memory space into SDRAM control signals.
(3) To provide proper PCI target control signals back to the Initiator to pace data flow.

By use of the principles of the present invention, each of these above functions are easily implemented, as described immediately below:

Central Resource: Any fair arbitration scheme may be implemented. Before the Central Resource may grant the PCI/Host bus to a PCI device, it acquires the bus from the CPU. CPU processes may continue during this period if on-board cache is available. PCI cycles may then begin. Upon return of the PCI/Host bus to idle, the PCI/Host bus is relinquished by the Central Resource and "normal" processing (i.e., by the CPU) can resume.

SDRAM Control: The logic translates a valid PCI address into row and column information. The row address is strobed with the "Set Row" command. PCI reads and writes are then handled in a new manner, as follows:

Reads: The read command is given to the SDRAM device repeatedly with the current column address until the master is ready to receive the data (i.e., when the IRDY# signal is low). The command is allowed to complete (length of time dependent upon read (i.e., the CAS# signal) latency). The column address is incremented and the cycle repeats.

Writes: Since writes are a one clock access, each time the master is ready (i.e., when the IRDY# signal is active) the write command is given and the column address incremented. PCI byte enables are used to determine the byte masks for the write operation. It should be noted that a special case occurs when the end of a row is reached. When this happens, the SDRAM is "precharged," the next row is selected with the "Set Row" command, and the read or write commands can continue.

PCI Target Signaling: The PCI/SDRAM logic needs only to signal when the SDRAM device is capable of accepting or providing data. When a valid address decode is detected, the DEVSEL# signal is asserted. During writes, the TRDY# signal is asserted any time the write command can be given to the SDRAM device (i.e., the row is active). During reads, the TRDY# signal is asserted for the clock periods in which valid data is driven by the SDRAM device, which is dependent on the SDRAM's CAS# signal latency. The standard STOP# signal need not even be implemented if all PCI devices in the system are well-behaved.

From a hardware standpoint, the PCI/SDRAM logic circuit includes PCI input registers and PCI output registers that interface to certain of the PCI control signals at the PCI device. If the computer system includes more than one (1) PCI device, then there will be a separate input register and output register for certain of these control lines for each of the PCI devices. The PCI/SDRAM logic circuit also includes an "address counter" that interfaces to the data bus for the CPU and SDRAM, and which is part of the PCI/Host bus that also interfaces to the multiplexed address/data lines of the PCI device. The address counter sends output addressing information to an "end of row detector circuit," and also to a "row/column address multiplexer," which in turn outputs information directly to the common address bus that communicates to the system CPU and SDRAM devices.

The PCI/SDRAM logic circuit also includes a "logic sequencer" that controls all of the important decisions made within the PCI/SDRAM logic circuit. This logic sequencer, as related above, decides when to release the PCI/Host bus to the PCI device (which then becomes the bus master), and also provides the correct output signals to perform read transactions and write transactions with respect to the PCI device. Once all of the PCI transactions are completed for a particular sequence, the bus control is then relinquished back to system CPU.

The timing of the output signals controlled by the logic sequencer and other components of the PCI/SDRAM logic are described in detail in the figures below and it will be understood that the advantages of synchronous memory devices are utilized in the present invention to increase the memory bandwidth as compared to asynchronous memory systems. Moreover, the present invention takes advantage of the capability to write data in bursts, which is also disclosed and illustrated hereinbelow. This also increases the memory bandwidth of the present invention with respect to conventional asynchronous memory systems used with PCI devices.

While the present invention is disclosed in a preferred embodiment for use with a laser printer, it will be understood that the principles of the present invention can be used for any computing system that includes one or more embedded PCI devices. This will include personal computers, workstations, network servers, and other peripheral equipment used on networks that interface to such PC's and workstations.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
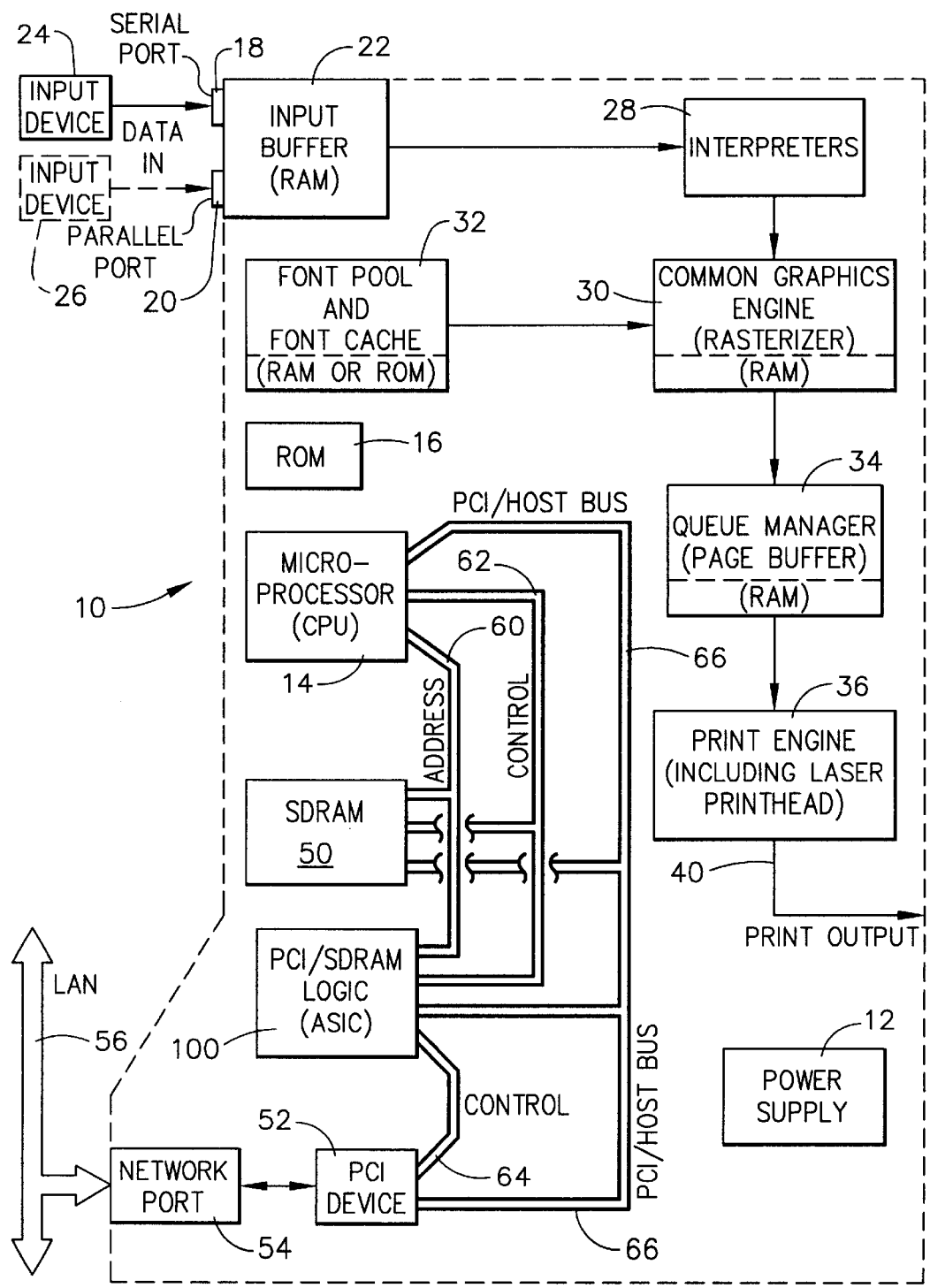
FIG. 1 is a block diagram of the major components of a computer system that controls a laser printer, and which includes an embedded PCI device, as constructed according to the principles of the present invention.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided by software operations into several portions for performing several different functions.

Laser printer 10 also contains at least one serial input or parallel input port, or in many cases both types of input ports, as designated by the reference numeral 18 for the serial port and the reference numeral 20 for the parallel port. Each of these ports 18 and 20 would be connected to a corresponding input buffer, generally designated by the reference numeral 22 on FIG. 1. Serial port 18 would typically be connected to a serial output port of a personal computer or a workstation that would contain a software program such as a word processor or a graphics package or computer aided drawing package. Similarly, parallel port 20 could be connected to a parallel output port of the same type of personal computer or workstation containing the same types of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a Queue Manager or page buffer, which is a portion of RAM designated by the reference numeral 34. In a typical laser printer, an entire page of rasterized data is stored in the Queue Manager during the time interval that it takes to physically print the hard copy for that page. The data within the Queue Manager 34 is communicated in real time to a print engine designated by the reference numeral 36. Print engine 36 includes a laser light source within its printhead (not shown), and its output 40 is the physical inking onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers.

Print engine 36 contains an ASIC (Application Specific Integrated Circuit) (not shown), which acts as a controller and data manipulating device for the various hardware components within the print engine. The bitmap print data arriving from Queue Manager 34 is received by this ASIC, and at the proper moments is sent in a serialized format to the laser printhead.

Figure 2:
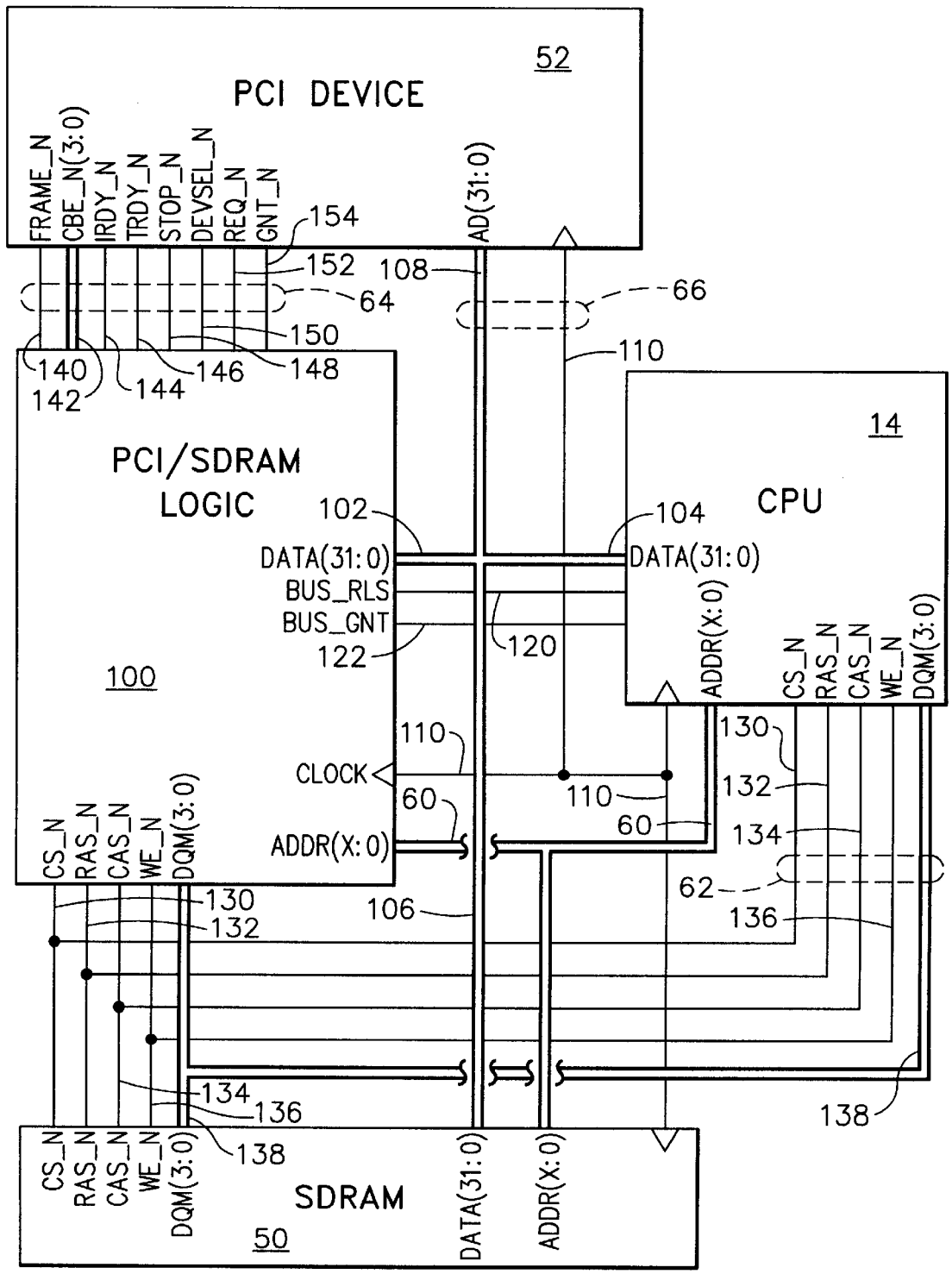
FIG. 2 is a block diagram depicting some of the major components utilized in the computer system of FIG. 1, while showing details of the various control lines, address lines, and data lines therebetween.

The various buses that are connected to the microprocessor 14 include an address bus 60, a control bus 62 (which contains various control lines), and a "PCI/Host bus" 66. This PCI/Host bus 66 includes the data bus lines for the microprocessor 14, and also includes the system clock which, as seen on FIG. 2, is depicted by the reference numeral 110. On FIG. 2, the data bus is given a different reference numeral at different portions of the circuit.

The system RAM in the present invention preferably comprises synchronous dynamic RAM (SDRAM), and as comprising a hardware element is generally designated by the reference numeral 50 on FIG. 1. It will be understood that the SDRAM 50 represents the physical hardware for the various RAM functions also depicted on FIG. 1, such as the rasterizer 30, Queue Manager 34, and other temporary memory repositories, such as the input buffer 22 and font pool/cache 32. The address bus 60 and control bus 62 both run directly between SDRAM 50 and microprocessor 14. Microprocessor 14 also will generally be referred to as a "CPU," which has the meaning of "central processing unit." It will be understood that CPU 14 could be any type of processing circuit or processing device, and not merely a microprocessor.

A PCI device 52 is depicted on FIG. 1, which in this illustrated embodiment represents a network controller, such as an ETHERNET controller. Accordingly, a network port 54 is connected to this PCI device 52, and in turn, network port 54 is connected to a local area network (LAN) 56.

The PCI device 52 requires certain control signals, which are represented on FIG. 1 by a control bus 64. A special logic circuit is provided to interface to both the PCI device 52 and to the system CPU 14 and SDRAM 50, and this logic circuit is referred to herein as the "PCI/SDRAM logic circuit" 100. Not only does the control bus 64 connect to this PCI/SDRAM logic circuit 100, but the address bus 60 and control bus 62 also directly connect to this logic circuit. In addition, the PCI/Host bus 66 also connects directly into the PCI/SDRAM logic circuit 100, and additionally directly connects to the PCI device 52. This is a unique configuration, because the data lines of a CPU and system memory are typically isolated from the data lines for a PCI device, and this location is typically provided by a PCI bridge circuit. In the present invention, the PCI bridge circuit is not necessary.

As will be explained in greater detail hereinbelow, the data bus is given different numeral designations at different locations on FIG. 2. At the PCI device 52, the data bus (at 108) is connected to thirty-two input/output ports that act in a multiplexed manner as both address ports and data ports. This is the case because PCI devices use these ports for shared address and data lines. For this reason, one cannot merely connect a data bus from these address/data ports of a PCI device directly into a microprocessor or a synchronous DRAM memory device without accounting for the fact that address data also exists on this bus during certain operational periods of the bus. Having said that, the present invention does indeed directly connect these address/data ports of a PCI device 52 into the data ports of the CPU 14 along the data bus lines 104, and into the data ports of the SDRAM 50 along the data bus 106. However, the PCI/SDRAM logic circuit 100 controls the timing of signals on these data bus locations 104 and 106, by also being directly connected into this data bus at the location 102. Because of the control provided by the PCI/SDRAM logic circuit 100, these various portions of the data bus can operate truly as a single PCI/Host bus 66 which is directly connected into all of these major components.

The PCI/SDRAM logic 100 comprises several major hardware components, all of which are formed preferably as a single ASIC (Application Specific Integrated Circuit). On FIG. 3 the major components are depicted in a block diagram format, including a "logic sequencer" 200 that controls the outputs of the PCI/SDRAM logic 100. Logic sequencer 200 has characteristics that allow it to perform some of the finctions of a microprocessor, however, there is no need in the illustrated embodiment for a fully-capable microprocessor chip as is commonly available. Instead, logic sequencer 200 provides a sequence of logical operations which are described in detail hereinbelow in conjunction with the flow chart 300 on FIG. 4.

Other components of the PCI/SDRAM logic 100 include "PCI input registers," generally indicated by the reference numeral 230, and "PCI output registers," generally indicated by the reference numeral 232. The PCI input registers 230 comprise a bank of rising-edge-triggered flip flop latches, which are used to provide "registered" or delayed versions of pertinent PCI signals to the logic sequencer 200. PCI output registers 232 also comprise a bank of rising-edge-triggered flip flop latches, which are used to provide "registered," or synchronous, outputs to the PCI device when possible. The use of the register banks 230 and 232 is common in this technical field when combined with a logic sequencer design.

Another major component of PCI/SDRAM logic 100 is an "address counter" 210, which comprises a common load/increment synchronous counter that is "n" bits long, dependent on the size of synchronous DRAM that can be addressed (e.g., typically 23 or 24 bits is sufficient). Address counter 210 is loaded from the data bus 102 when instructed to do so by logic sequencer 200. The counter can be incremented (by 1) on any clock cycle that the logic sequencer requests. Its output (its current count) is freely available to the other circuit blocks around it. The count represents the address of the current PCI data state or phase, and is used by an "end of row detector" 220 and a "row/column address multiplexer" 222.

Typical synchronous DRAM's are arranged in rows of 256 data cells. PCI transactions that contain more than one data phase (where more than one word of data is used during a single bus usage) access the data sequentially. Thus, a transaction may start in the middle of a row of data cells and eventually spill over into the next row of data. It is important for the logic sequencer 200 to be aware of this condition (which is referred to as an "end of row" state, or "EOR"). To accomplish this function, the lowest eight (8) bits of the current word address (i.e., the least significant 8 bits of the address counter) are fed to the end of row detector 220, which preferably comprises an 8-input AND gate. The resulting signal, EOR (at reference numeral 206), is active high only when all 8 bits are in the Logic 1 state, which indicates a position in the synchronous DRAM (e.g., SDRAM 50) at the end of a row (column address $255_{10}$, or $FF_{16}$). This EOR signal 206 is used as an input to logic sequencer 200.

When logic sequencer 200 sends Bank Activate, Read, and Write commands to SDRAM 50 it is necessary to provide the corresponding row or column address to the SDRAM 50. A "row/column address multiplexer" indicated at the reference numeral 222 performs this operation as directed by the logic sequencer's "SEL" (select) signal 202. The actual row and column addresses that needs to be presented to SDRAM 50 varies according to the design and size (organization) of the synchronous DRAM device, and is provided by the SDRAM manufacturer.

Figure 3:
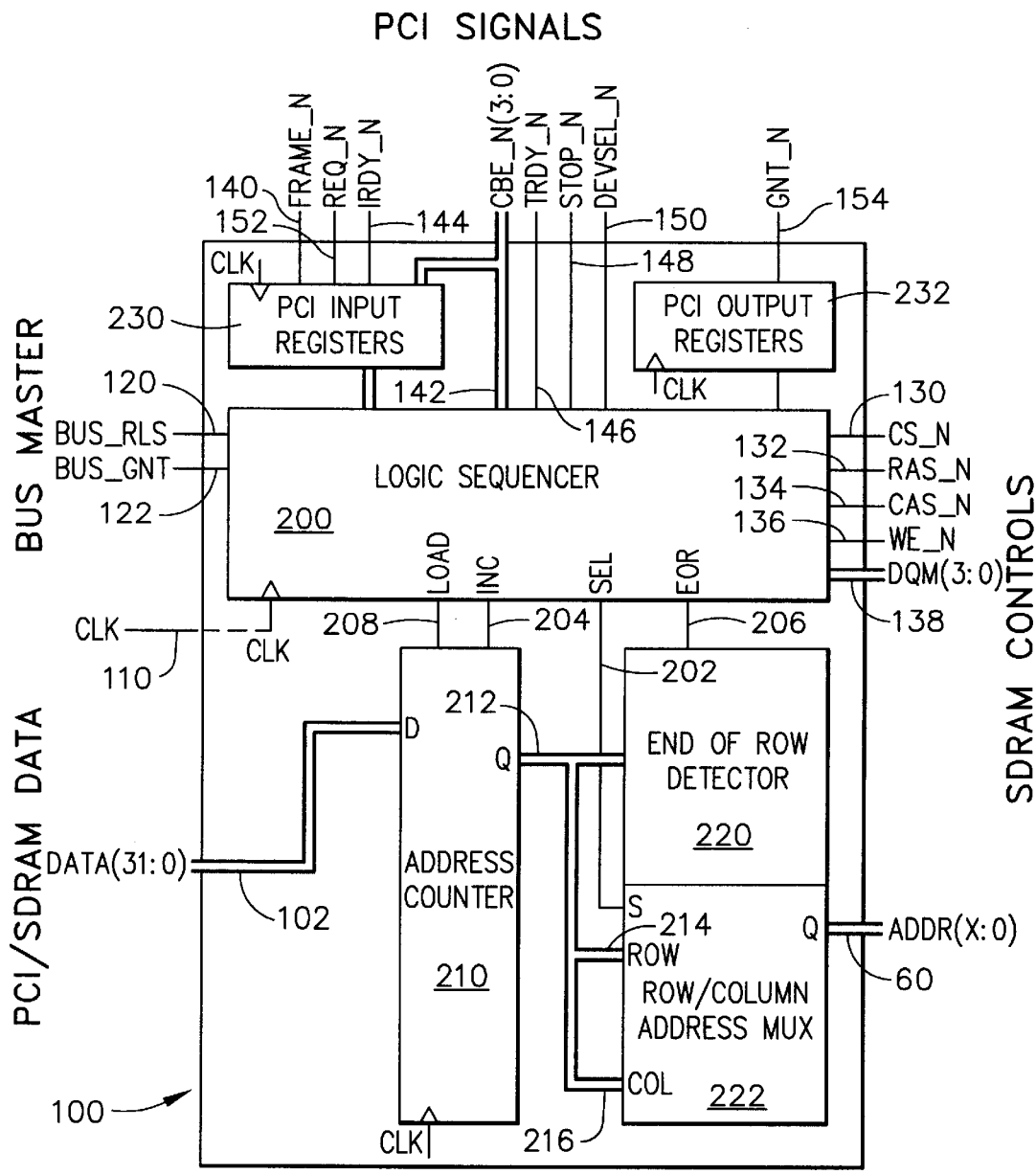
FIG. 3 is a block diagram of the PCI/SDRAM logic circuit used in the computer system of FIG. 2.

A description of the various signals used in the preferred embodiment illustrated in FIGS. 2 and 3 is provided immediately below. Starting with "system signals," the "CLK" signal 110 represents a common system clock is shared between CPU 14, PCI Device 52, SDRAM 50, and PCI/SDRAM logic 100. CPU 14, PCI Device 52, and SDRAM 50 only look at input signals on the rising edge of the system clock in the illustrated system. The PCI/SDRAM logic 100 has a few asynchronous signals that may change in the middle of a clock cycle, but it generally operates on the same rising edge of the system clock 110. Clock speeds in this system can approach 33 MHz, depending on the application and speed of the PCI Device 52, SDRAM 50, and PCI/SDRAM logic 100 technology.

The PCI/Host bus 66 acts as another "system" signal carrier (which also includes the system clock or "CLK"), however, its component signal-carrying bus performs as a data bus for some of the system devices and as an address/data bus for PCI devices in the illustrated system. The data signals carried by the PCI/Host bus 66 are described in detail hereinbelow.

The "PCI signals," grouped as a PCI control bus 64, will next be described. All of the PCI signals are bi-directional in nature. The driving agent for each is determined by which device initiates the access. In the preferred embodiment, all transfers are initiated by the PCI device 52 being "bridged" to the SDRAM 50. Therefore, the input/output nature of each signal is predetermined for the purpose of this design. Individual descriptions of these signals are provided immediately below:

"AD(31:0)"—the Address/Data lines which comprises a 32 bit signal bus 108 that carries the transaction address and subsequent data words in a multiplexed signal format. During the Address Phase (the first phase in which the FRAME_N signal 140 is low), the PCI Device 52 drives the AD lines 108. During write transactions, the PCI device 52 continues to drive AD lines 108 (with the data it is writing). During read transactions, the PCI device 52 causes its input/output ports to go into a tri-state ("high-Z") mode, and the PCI/SDRAM logic 100 causes the SDRAM 50 to drive the data bus 106 with the proper data.

"FRAME_N"—a Cycle Frame signal 140 which indicates the beginning (and continuation) of an access. In the preferred embodiment, it is an output of the PCI device 52 and an input of the PCI/SDRAM logic 100.

"CBE_N(3:0)"—this is a set of Bus command and Byte Enables signals 142. During the address phase of a transaction, CBE_N 142 define the type of command being initiated (i.e., read or write). During data phases, it determines which lanes (bytes) of data are valid. For this case, these signals are outputs of the PCI device 52 and inputs of the PCI/SDRAM logic 100.

"REQ_N"—a Request signal 152 which is driven low by the PCI device 52 to indicate that it requires use of the PCI/Host bus 66 to perform a transaction.

"IRDY_N"—an Initiator Ready signal 144 which indicates the initiating agent can complete the current data phase of the transaction. In the preferred embodiment, it is an output of the PCI device 52 and an input of the PCI/SDRAM logic 100.

"TRDY_N"—a Target Ready signal 146 indicates the target agent can complete the current data phase of the transaction. In the preferred embodiment, TRDY_N is driven by the PCI/SDRAM logic 100 and is an input of the PCI device 52. When IRDY_N 144 and TRDY_N 146 are both active (low), data is transferred between SDRAM 50 and the PCI device 52.

"STOP_N"—a Stop signal 148, driven by the target agent, is driven active to inform the initiator that it should stop the current transaction as soon as possible. In the preferred embodiment, it is never driven active.

"DEVSEL_N"—a Device Select signal 150 is driven by the target agent to indicate that a valid target exists for the current transaction. It is driven by the PCI/SDRAM logic 100 and is an input of the PCI device 52.

"GNT_N"—a Grant signal 154 indicates to the agent that it has been granted the PCI/Host bus 66 and should initiate a transaction. It is driven by the PCI/SDRAM logic 100.

The "CPU signals" will next be described. In the preferred embodiment, the CPU (central processing unit) 14 is considered "bus owner" and generally controls the use of the system data, address, and control buses. This includes the address bus 60, CPU control bus 62, and the PCI/HOST bus 66. The PCI/SDRAM logic 100 requests the PCI/HOST bus 66 from the CPU 14 and, when granted, the PCI/SDRAM logic 100 is free to use the PCI/HOST bus 66 as it wishes until it removes its request. Individual descriptions of these CPU signals are provided immediately below:

"BUS_RLS"—a Bus Release signal 120 that is driven low by the PCI/SDRAM logic 100 to indicate to the CPU 14 that it needs the PCI/HOST bus 66 to perform an operation. Once granted, the PCI/SDRAM logic 100 drives the signal 120 high to show that the PCI/HOST bus 66 is free for the processor to use.

"BUS_GNT"—a Bus Granted signal 122 that is driven low by the CPU 14 to indicate that it has turned off its bus drivers and made the system data, address, and control buses free for use by the PCI/SDRAM logic 100.

The "SDRAM signals" will next be described. Most of the time, a memory controller unit (the CPU 14, for instance) uses the SDRAM 50 by issuing activate, read, write, and precharge commands to it via several control lines (e.g., CPU control lines 62). When the PCI/SDRAM logic 100 is activated by a PCI request, these signals are "borrowed" from the central controller (e.g., CPU 14) and used to allow the PCI device 52 direct communication with the SDRAM 50. All SDRAM signals need only be valid at the rising edge of the system clock (i.e., CLK 110). All signals are input-only of the SDRAM 50, except the data bus 106 which is bi-directional. Individual descriptions of these signals are provided immediately below:

"CS_N"—a Chip select signal 130. No commands are issued to the SDRAM 50 unless the CS_N signal 130 is driven active low.

"RAS_N"—a Row Address Strobe signal 132. This is used to give the SDRAM 50 the Row Address of the accessed data during the Bank Activate command. It is also used during Precharge commands.

"CAS_N"—a Column Address Strobe signal 134. This is used to give the SDRAM 50 the Column Address of the accessed data during Read or Write commands.

"WE_N"—a Write Enable signal 136. This signal determines (when used with CAS_N 134) whether the Column Address applies to a Read command (WE_N 136 high) or a Write Command (WE_N 136 low). It also distinguishes between a Bank Activate command (WE_N 136 high) or a Precharge command (WE_N 136 low) when RAS_N 132 is active.

"DQM(3:0)"—a set of Data Mask signals 138. These signals serve as byte enables to indicate which data bytes are valid during a read or write command.

"ADDRESS(X:0)"—address signals 60 (the number of signals depend on the size of the SDRAM) which are used to indicate the row or column address of the data matrix during Bank Activate, Read, and Write commands. These signals are also used by the CPU 14 and by the PCI/SDRAM logic 100.

"DATA(31:0)"—data signals 106 which act as inputs when data is being written to the SDRAM 50, and act as outputs when data is being read from the SDRAM 50. These same signals are used by the CPU 14 (at data lines 104—a portion of the "data bus" and the PCI/Host bus 66) and by the PCI/SDRAM logic (at data lines 102—a portion of the "data bus" and the PCI/Host bus 66).

Figure 4:
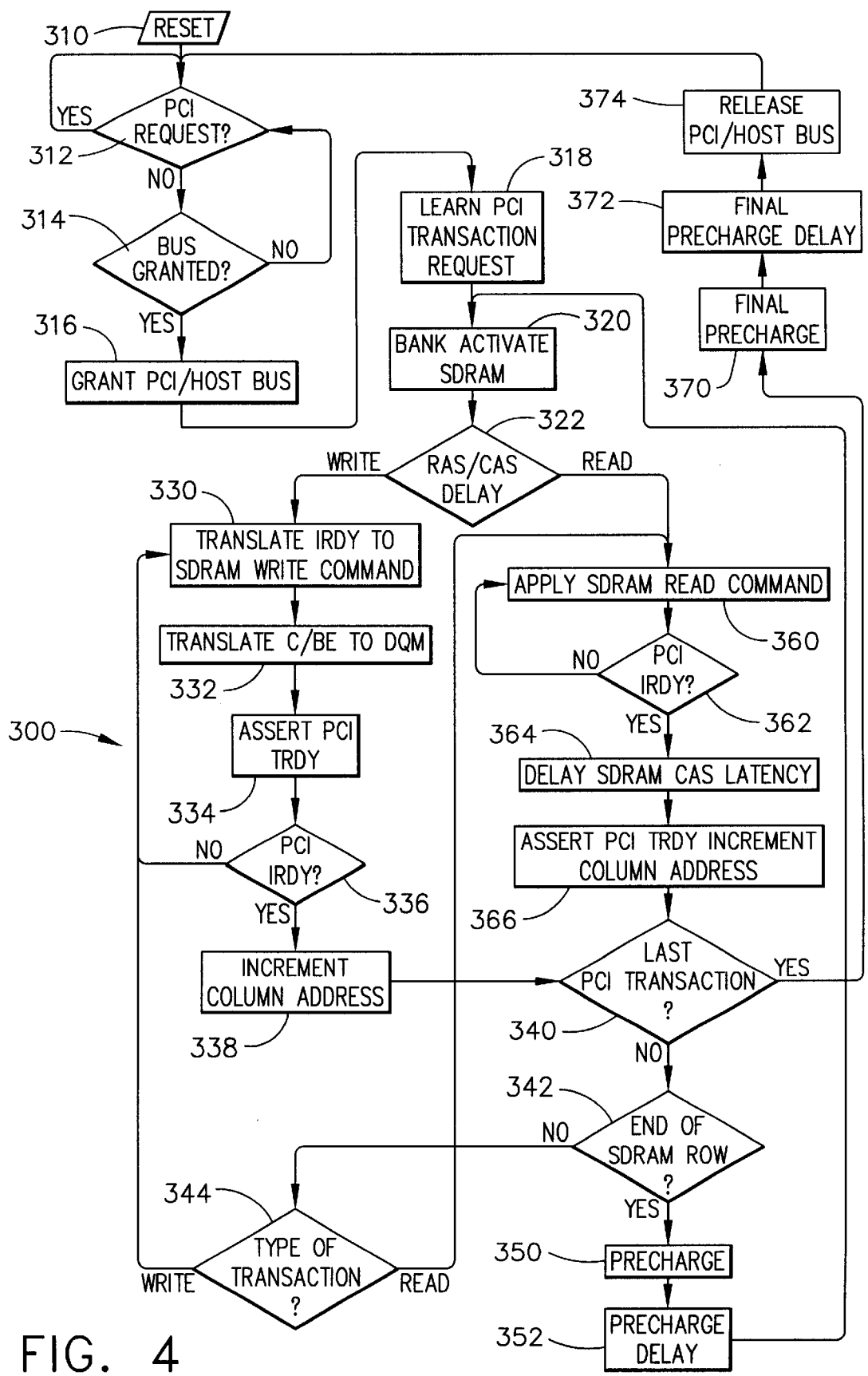
FIG. 4 is a flow chart depicting the operational steps in granting bus access to the PCI device of the computer system in FIG. 1.

A flow chart 300 of the operational steps performed by logic sequencer 200 is depicted on FIG. 4. The timing of the output signals is described below with a description of each step or decision made by the logic sequencer. Note that each step does not correspond clock-per-clock of the movement through the logic sequencer. Some phases fall through in zero clocks, others remain active for multiple clocks. The timing diagrams of FIGS. 5 and 6 further illustrate a preferred arrangement of these output signals.

At a step 310, during a system "Reset," the logic sequencer goes to a known, idle state. All signals are inactive, and the CPU 14 owns the PCI/Host bus 66. After the reset is complete, at a decision step 312, the logic temporarily goes into an idle mode where it waits for a "PCI request" (in which the signal REQ_N 152 goes active). All output signals are inactive until the REQ_N signal 152 changes state. When REQ_N goes active, the logic flow is directed to a decision step 314, where it determines when the PCI/Host bus becomes available.

During step 314, the logic sequencer 200 asserts a BUS_REQ signal (on the timing diagrams of FIGS. 5 and 6, which is the same as the BUS_RLS signal 120 on FIGS. 2 and 3), and waits for the BUS_GNT signal 122 to go active, meaning that the PCI/Host bus 66 is free to use. If the PCI device 52 misbehaves by prematurely terminating its request for the PCI/Host bus in which REQ_N 152 goes inactive during this period, the system returns to the Idle step 312. Otherwise, when BUS_GNT 122 goes active, the logic sequencer proceeds to the next step at 316, "Grant PCI/Host bus."

During step 316, the GNT_N signal 154 is asserted to the PCI device requesting the PCI/Host bus. The logic sequencer then waits for the FRAME_N signal 140 to go active, signaling that the transaction has started. When that occurs, the "Learn PCI Transaction Request" step (see below) becomes active. During the Grant PCI/Host bus step 316, the LOAD signal 208 is provided to the address counter 210 so that it is continually loading the address value on the data bus 102 via the DATA(31:0) lines. This causes the address to be loaded into the counter 210 when the transaction begins.

The next step in the logic flow is a step 318, "Learn PCI Transaction Request." The logic sequencer 200 now makes note of whether the requested transaction is a read or write request. This is done by decoding the CBE_N(3:0) signals 142, as per the PCI Specification. This phase falls through to a decision step 320 "Bank Activate SDRAM." The logic sequencer starts driving DEVSEL_N 150 active and STOP_N 148 inactive to signal that it has accepted the PCI transaction. It will continue to drive these two lines until the transaction is completed (in a step 370 "Final Precharge").

During the Bank Activate SDRAM step 320, the row address is placed on the address bus 60 of the SDRAM 50 by activating the SEL line 202 to the Row/Column Address Multiplexer 222. The outputs of the address counter 210 place the row address signals on the Row/Column Bus 212, and with SEL line 202 active, the input signals at the bus 214 (i.e., the "row" inputs) pass through the multiplexer switching circuitry to be placed on the address bus 60. These signals are the "row address" signals, which correspond to the upper address lines of the address binary value. In addition, the Bank Activate command is given to the SDRAM 50 by asserting the CS_N and RAS_N signals 130 and 132, respectively. The logic flow then falls through to the next step 322 on flow chart 300 in one clock cycle. The SEL line 202 is inactivated.

At a decision step 322 (the "Ras/Cas Delay" step), logic sequencer 200 performs timing required by the SDRAM 50 between the Bank Activate command and any other command. The logic sequencer 200 remains at this step 322 for a number of clock cycles equal to the R/C Delay (which is due to the RA strobe and CA strobe setup time), which is typically 1 clock cycle (but could be much longer). This time delay is published by the SDRAM manufacturer. When the delay period is over, logic sequencer 200 goes either to a step 330 to perform an "SDRAM Write Command" or to a step 360 to perform an "SDRAM Read Command," depending on which transaction type was noted previously (at step 318).

This description will now follow the logic flow to perform an SDRAM Write Command, which is an operation involves several individual steps which all generally take place within a single clock cycle. These steps are referred to hereinbelow as "SDRAM Write Command (step 330), C/BE to DQM (step 332), PCI TRDY (step 334), and PCI IRDY (step 336). All four steps occur in a single clock cycle, as well as the following four steps, if applicable. In the first step, if IRDY_N 144 is asserted during the clock cycle, the logic sequencer gives the Write command to the SDRAM 50 by asserting the signals CS_N 130, CAS_N 134, and WE_N 136. Meanwhile, the CBE_N lines 142 are reasserted as DQM (data mask) to the SDRAM 50 (at step 332). Now the logic sequencer 200 asserts TRDY_N 146 ("target ready," at step 334), signaling that it can complete the transaction. If IRDY_N 144 ("initiator ready," at step 336) is asserted by the end of the clock cycle, the logic sequencer 200 directs the logic flow to a step 338, "Increment Column Address," else it stays in this phase (i.e., the SDRAM Write Command mode) at step 330.

At step 338, "Increment Column Address," the column address is incremented by asserting the INC signal 204 to the Address Counter 210. The outputs of the address counter 210 place the column address signals on the Row/Column Bus 212, and with SEL line 202 already inactive, the input signals at the bus 216 (i.e., the "column" inputs) pass through the multiplexer switching circuitry to be placed on the address bus 60. These signals are the "column address" signals, which correspond to the lower address lines of the address binary value. The logic flow then falls through to check the "Last PCI Transaction," at a decision step 340.

During decision step 340, "Last PCI Transaction," the logic sequencer checks for the presence of the FRAME_N signal 140, to determine if the previously completed data phase was the last in this transaction. When asserted, FRAME_N signal 140 indicates that more data is coming, and the logic flow is directed to a decision step 342, "End of SDRAM Row." If FRAME_N signal 140 is not asserted, then the logic flow is directed to a decision step 370, "Final Precharge."

At decision step 342, "End of SDRAM Row," the EOR signal 206 is inspected to determine if the end of this row in the SDRAM 50 has been reached. This decision is made asynchronously, typically in less than one clock cycle. If the EOR signal 206 is active, this is the end of the row and the logic sequencer directs the logic flow either to a "Precharge" step 350, or the logic falls through to a "Type of Transaction" decision step 344 in zero clocks.

A decision step 344, "Type of Transaction," the logic sequencer checks the type of transaction it recorded at step 318, and accordingly directs the logic flow to either a "Write Command" transaction or a "Read Command" transaction, as necessary. If the transaction type is a Write Command, the logic flow returns to step 330. If the transaction type is a Read Command, the logic flow arrives at a step 360, described below in greater detail.

At the "Precharge" step 350, the logic sequencer asserts a "Precharge Both Banks" command to the SDRAM 50 by asserting the signals CS_N 130, RAS_N 132, and WE_N 136 to the SDRAM. TRDY_N 146 is driven inactive to insert PCI wait states which occurs at a "Precharge Delay" step 352.

The "Precharge Delay" step 352 is used to perform timing required by the SDRAM 50 between the Precharge command and the Bank Activate command. The logic sequencer stays here for a number of clock cycles equal to the precharge delay, which typically is 1 clock cycle. This precharge delay is published by the SDRAM manufacturer. When the precharge delay is over, the logic sequencer directs the logic flow to the "Bank Activate" step 320.

To read the SDRAM 50, during the "Apply SDRAM Read Command" step 360 logic sequencer 200 asserts the signals CS_N 130 and CAS_N 134 while applying the column address (SEL 202 inactive). TRDY_N 146 is driven inactive to insert PCI wait states. The logic sequencer then checks IRDY_N 144 at a step 362 to see if the initiator is ready and the read cycle can proceed. If IRDY_N 144 is asserted, the logic sequencer directs the logic flow to a step 364, "Delay CAS Latency," else it returns to the Apply SDRAM Read Command step 360, thereby reasserting the read command until IRDY_N 144 goes active.

The logic sequencer 200 remains in step 364, "Delay SDRAM CAS Latency," for enough clock cycles to match up with the SDRAMs operating read data latency (typically 2 or 3 clocks, depending on clock speed). The logic sequencer keeps TRDY_N 146 unasserted while in this state, then directs the logic flow to a step 366, "Assert PCI TRDY." The read command to the SDRAM 50 is allowed to continue during step 366.

During step 366, "Assert PCI TRDY," SDRAM 50 is presenting the requested data on the data bus 106 during this cycle. The logic sequencer completes the data phase by asserting TRDY_N signal 146. It also increments the address by asserting INC signal 204 to the Address Counter 210. Logic sequencer 200 then directs the logic flow to decision step 340, "Last PCI Transaction," and the read command is complete.

If the result at decision step 340 is YES (i.e., if this was the last PCI transaction), then the logic flow is directed to a step 370, "Final Precharge." This step is identical to the "Precharge" step 350, except that the logic sequencer no longer asserts the PCI DEVSEL_N signal 150, which indicates that the PCI transaction is completed. After step 370 is complete, the logic flow continues to a step 372, "Final Precharge Delay," which behaves like the "Precharge Delay" step 352, except the PCI signals are no longer asserted. When the delay is over at step 372, the logic sequencer directs the logic flow to a "Release PCI/Host bus" step 374.

At step 374, "Release PCI/Host bus," logic sequencer 200 drives the BUS_RLS signal 120 inactive and waits for the CPU 14 to reacknowledge the bus (typically by deasserting BUS13 GNT 122). The logic sequencer then enters its "Idle" state at decision step 312, waiting for another PCI request to be made by a PCI device.

It will be understood that the tasks of reading from and writing to the CPU (i.e., microprocessor 14) are performed by known techniques. The CPU is the primary bus master in the preferred embodiment illustrated on FIG. 2, and CPU 14 releases the PCI/Host bus 66 to the PCI device 52 (via logic sequencer 200) when asked by the BUS_RLS line 120, by asserting a signal on the BUS_GNT line 122.

Figure 5:
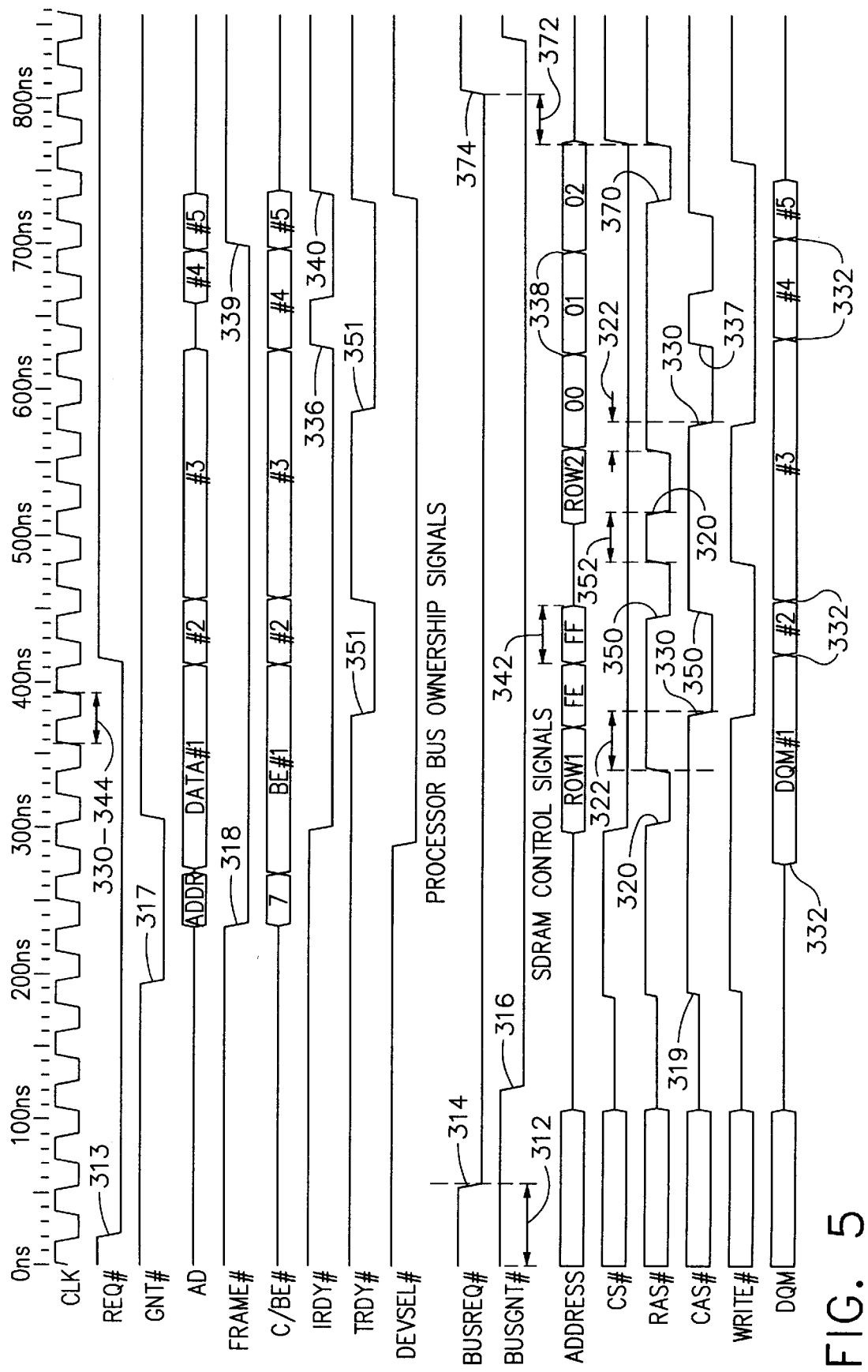
FIG. 5 is a timing diagram showing an example write transaction by the PCI device into SDRAM address space of the computer system of FIG. 1.

Sample Write Transaction: FIG. 5 is a timing diagram that shows a typical PCI write transaction into the SDRAM address space of the present invention. In both FIGS. 5 and 6 most of the reference numerals relate to process steps depicted in flow chart 300 on FIG. 4. First, a potential bus master requests the PCI/Host bus, at 313. This causes the central resource of the PCI/SDRAM logic circuit 100 to make a local bus request to the CPU 14, at 314. When the CPU grants control of the bus (i.e., signal BUSGNT# goes low at 316), the central resource grants the PCI device 52 the idle bus (i.e., signal GNT# goes low at 317).

The transaction begins at 318 with the SDRAM controller taking the address of the PCI cycle and converting it into row and column addresses. The SDRAM 50 is bank activated at 320 by presenting the row address and asserting the RAS# signal at 320. When the column address is presented and CAS# is asserted at 330 to initiate a write cycle, TRDY# is asserted at 351 so that the PCI data transfer is acknowledged. Because (in this example) after two writes the column address (0xFF at 342) is at the end of the SDRAM row, TRDY# is deasserted and the precharge command is given to the SDRAM (RAS# and WRITE# low at 350). The new row is made active (i.e., signal RAS# goes low at 320), followed by the assertion of signal TRDY# at 351 as the write command is again given to the SDRAM at 330.

When the initiator inserts wait states (signal IRDY# goes high at 336), the SDRAM write command is blocked by deasserting CAS# at 337. As writes become complete (with to IRDY# and TRDY# low), the column address is incremented at 338 (more than once in a burst mode) by the SDRAM controller. Similarly, new data byte masks (DQM) are generated at 332 from the byte enables (C/BE#) on the PCI/Host bus. Finally, the burst completes (FRAME# high at 339), and the SDRAM 50 is precharged and the bus control is returned to the CPU 14.

Figure 6:
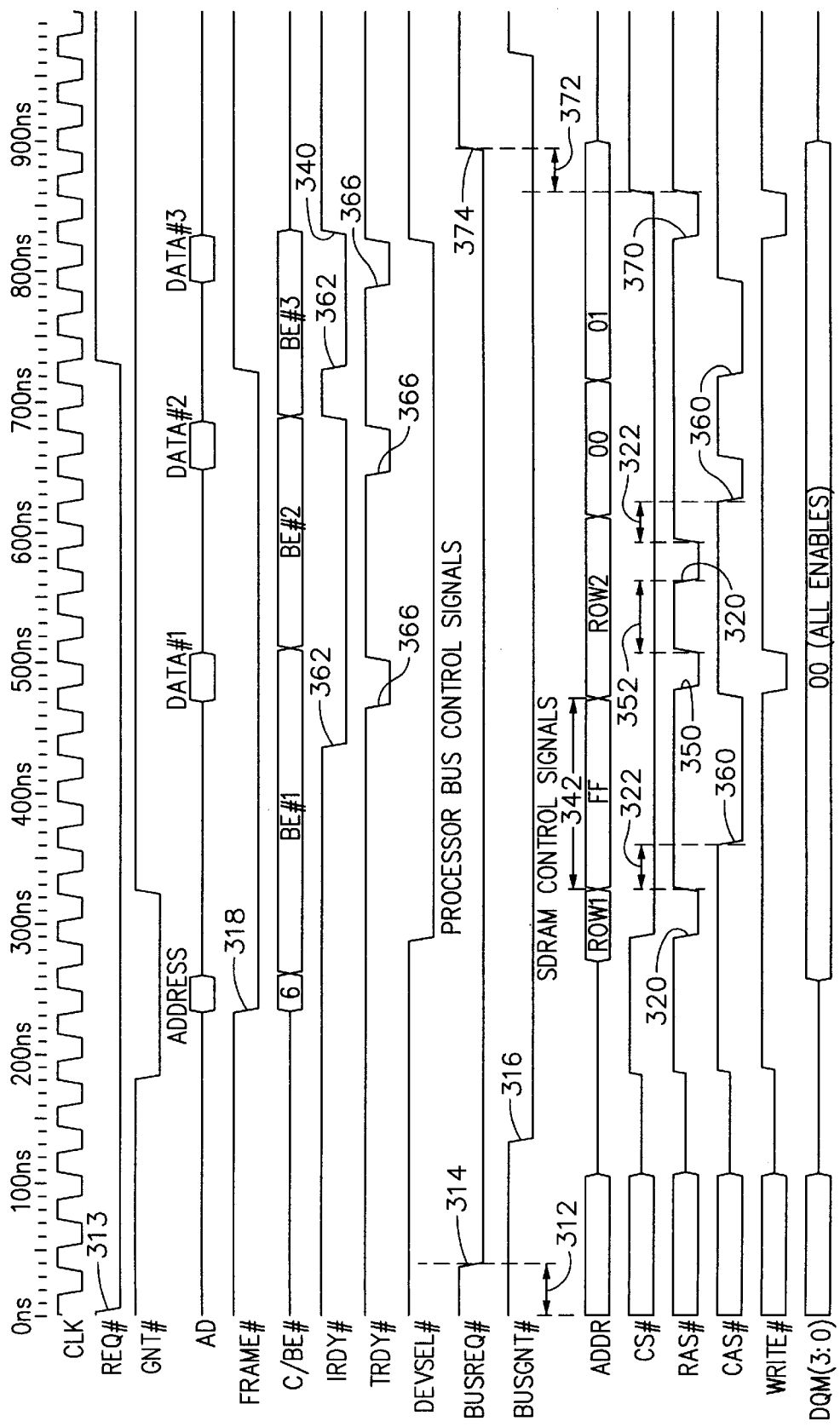
FIG. 6 is a timing diagram showing an example read transaction by the PCI device from SDRAM address space of the computer system of FIG. 1.

Sample Read Transaction: FIG. 6 is a timing chart that illustrates a typical PCI read transaction from SDRAM address space as according to the present invention. This timing chart shows an SDRAM setup with a CAS latency of one (1), meaning data appears on the bus one (1) clock after the read is made. This can be seen in FIG. 6 by inspecting the number of clocks between CAS# low at 360 (i.e., the read command) and TRDY# low at 366 (i.e., target ready). It is important to note that the read command is given repeatedly until the initiator is ready (i.e., signal IRDY# goes low at 362) so read data is available with minimum latency. FIG. 6 also shows how a row boundary condition is handled in a similar manner to that illustrated in FIG. 5.

Figure 7:
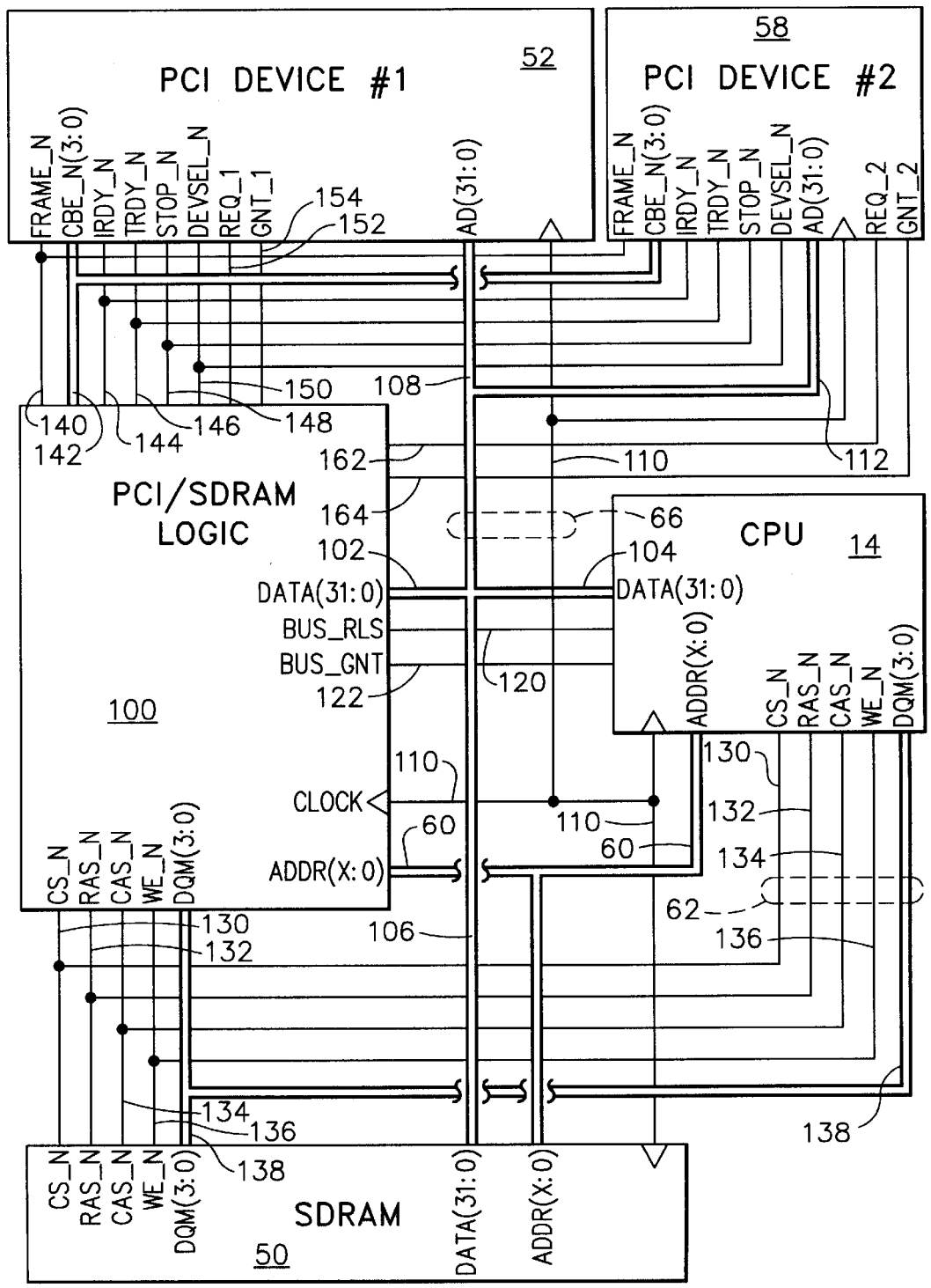
FIG. 7 is a block diagram of the major components of the computer system of FIG. 1 in which there are multiple PCI devices.

FIG. 7 illustrates the same major components as were depicted in FIG. 2 with the addition of a second PCI device 58. As can be seen in FIG. 7, when there is more than a single PCI device in the computer system of the present invention, most of the PCI control lines are common between each of the multiple PCI devices. The exception to this statement is the requirement to have separate "grant" and "request" lines for each of the PCI devices.

On FIG. 7, PCI Device #1 (reference numeral 52) uses a request line termed "REQ_1", designated at the reference numeral 152. Similarly, PCI Device #2 (reference numeral 58) communicates to a second request line at its output port termed "REQ_#2" at reference numeral 162. When one of these PCI devices wants to request the PCI/Host bus 66 while performing a transaction, the appropriate PCI device drives its respective REQ line low to indicate its need for the PCI/Host bus.

PCI Device #1 includes an input termed "GNT_#1" that is in communication with a line 154 that is controlled by the PCI/SDRAM logic circuit 100. Similarly, PCI Device #2 includes a "GNT_#2" input that is in communication with a line 164 that also is under the control of the PCI/SDRAM logic circuit 100. A GNT signal is provided to the appropriate PCI device (i.e., as the agent that has been granted the PCI/Host bus 66) to indicate to that PCI device that it should now initiate the desired transaction.

It will be understood that any number of PCI devices could be added to the computer system of FIG. 7 without departing from the principles of the present invention. It will further be understood that the exact timing of signals as depicted on FIGS. 5 and 6, and the exact process steps is depicted on flow chart 300 could be modified without departing from the principles of the present invention. However, as long as the PCI specification for use with PC's remains in its present form, it is preferred that the process steps and timing of signals remain as illustrated in the above-referenced figures. As general computer systems, such as PC's, begin using synchronous dynamic RAM for their main memory, it will become more apparent that the principles of the present invention are quite useful when embedding PCI devices in such computer systems.

The PCI/SDRAM logic circuit described hereinabove has been successfully demonstrated in an embedded PCI networking application. The logic sequencer 200 requires only 1500 ASIC gates for implementation in a gate-array. Exemplary prototypes have been designed using antifuse field programmable gate arrays, which successfully run without special considerations at 25 MHz. This resulted in a PCI/Host bus bandwidth of 100 megabytes per second, operating at zero wait states during PCI write bursts. No internal storage (data buffering) was required and the unit required only one set of data bus pins (i.e., 32 pins). If the full 4 gigabyte address space is not needed for decoding, even a subset of those pins may be used.

The architecture described hereinabove combines two relatively new technologies to produce a low-cost, high performance system. This scheme provides a way to implement embedded PCI designs without the usual complexity and associated costs. By using SDRAM, the user can eliminate any DRAM to PCI bridge circuit (as found in conventional circuits). This reduces pin and gate counts in addition to providing zero wait state performance. The logic design involved in realizing this architecture is simple enough it can be fully implemented in inexpensive programmable logic.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is clamed is:

1. A computer system, comprising:
   (a) a processing circuit;
   (b) a memory circuit;
   (c) at least one PCI device;
   (d) a PCI logic circuit; and
   (e) a PCI/host bus that communicates signals directly to each of said processing circuit, said memory circuit, said at last one PCI device, and said PCI/RAM logic circuit without any intervening component;
   wherein said PCI/RAM logic circuit provides proper interfacing between said processing circuit, said memory circuit, and said at least one PCI device.

2. The computer system as recited in claim 1, wherein said memory circuit comprises synchronous dynamic random access memory.

3. The computer system as recited in claim 1, wherein said PCI device comprises an embedded peripheral circuit that uses clock-edge data transfers.

4. The computer system as recited in claim 1, wherein said PCI/RAM logic circuit comprises a logic sequencer, an SDRAM interface, and a PCI interface.

5. The computer system as recited in claim 1, wherein said PCI/RAM logic circuit comprises a central resource, an SDRAM controller, and a PCI controller.

6. The computer system as recited in claim 1, wherein said PCI/host bus comprises a data bus, and a clock line.

7. The computer system as recited in claim 6, wherein the data bus portion of said PCI/host bus comprises, at various locations within said computer system, a multi-line data bus or a multiplexed address/data bus.

8. The computer system as recited in claim 1, further comprising a print engine, and a communications port that is effectively connected to at least one external device and to said memory circuit.

9. A method for interfacing a processing circuit and at least one PCI device in a computer system said method comprising:
   (a) providing a proessing circuit, a memory circuit, at least one PCI device, and a PCI/RAM logic circuit;
   (b) providing a PCI/host bus to interface directly to each of said processing circuit, said memory circuit, said at least one PCI device, and said PCI/RAM logic circuit without any intervening component;
   (c) controlling, via said PCI/RAM logic circuit, said processing circuit, memory circuit, and at least one PCI device so as to communicate data between said processing circuit, memory circuit, and at least one PCI device; and
   (d) controlling, without the use of any PCI bridge cicuit, said PCI/host bus so as to provide proper interfacing between said processing circuit, said memory circuit, said at least one PCI device, and said PCI/RAM logic circuit.

10. A method for interfacing a processing circuit and at least one PCI device in a computer system, said method comprising:
   (a) providing a processing circui, a memory circuit, at least one PCI device, and a PCI/RAM logic circuit;
   (b) providing a PCI/host bus to interface directly to each of said processing circuit, said memory circuit, said at least one PCI device, and said PCI/RAM logic circuit without any intervening component; and
   (c) controlling, via said PCI/RAM logic circuit, said processing circuit, memory circuit, and at least one PCI device so as to communicate data between said processing circuit, memory circuit, and at least one PCI device, by arbitering requests from said at least one PCI device for control of said PCI/host bus, translating PCI initiator accesses directed to said memory circuit into random access memory control signals, and providing PCI target control signals to pace data flow.

11. The method as recited in claim 9, wherein said memory circuit comprises synchronous dynamic random access memory.

12. The method as recited in claim 9, wherein said PCI device comprises an embedded peripheral circuit that uses clock-edge data transfers.

13. The method as recited in claim 9, wherein said PCI/RAM logic circuit comprises a logic sequencer, an SDRAM interface, and a PCI interface.

14. The method as recited in claim 9, wherein said PCI/RAM logic circuit comprises a central resource, an SDRAM controller, and a PCI controller.

15. The method as recited in claim 9, wherein said PCI/host bus comprises a data bus, and a clock line.

16. The method as recited in claim 15, wherein the data bus portion of said PCI/host bus comprises, at various locations within said computer system, a multi-line data bus or a multiplexed address/data bus.

17. The method as recited in claim 9, further comprising the step of providing a print engine, and a communications port that is effectively connected to at least one external device and to said memory circuit.

18. An image forming apparatus, comprising:

(a) a memory circuit for storage of data;

(b) a communications port that is effectively connected to at least one external device and to said memory circuit;

(c) a prit engine that receives print data from said memory circuit, and creates an image output;

(d) a processing circuit that is configured to control the flow of data between said memory circuit, communications port, and print engine;

(e) at least one PCI device;

(f) a PCI/RAM logic circuit; and (g) a PCI/host bus that communicates signals directly to each of said processing circuit, memory circuit, at least one PCI device, and PCI/RAM logic circuit without any intervening component;

wherein said PCI/RAM logic circuit provides proper interfacing between said processing circuit, said memory circuit, and said at least one PCI device.

19. The image forming apparatus as recited in claim 18, wherein said memory circuit comprises synchronous dynamic random access memory.

20. The image forming apparatus as recited in claim 18, wherein said PCI device comprises an embedded peripheral circuit that uses clock-edge data transfers.

21. The image forming apparatus as recited in claim 18, wherein said PCI/RAM logic circuit comprises a logic sequencer, an SDRAM interface, and a PCI interface.

22. The image forming apparatus as recited in claim 18, wherein said PCI/RAM logic circuit comprises a central resource, an SDRAM controller, and a PCI controller.

23. The image forming apparatus as recited in claim 18, wherein said PCI/host bus comprises a data bus, and a clock line.

24. The image forming apparatus as recited in claim 23, wherein the data bus portion of said PCI/host bus comprises, at various locations within said computer system, a multi-line data bus or a multiplexed address/data bus.

* * * * *

UNITED STATES PATENT AND TRADEMARK OFFICE
CERTIFICATE OF CORRECTION

PATENT NO. : 6,247,088 B1
DATED : June 12, 2001
INVENTOR(S) : Toshio Seo et al.

It is certified that error appears in the above-identified patent and that said Letters Patent is hereby corrected as shown below:

<u>Title page,</u>
Item [54], "SYNCRONOUS" should read -- SYNCHRONOUS --.

<u>Column 18,</u>
Line 6, "PCI" should read -- PCI/RAM --
Line 60, "circui," should read -- circuit, --

Signed and Sealed this

Ninth Day of April, 2002

Attest:

*Attesting Officer*

JAMES E. ROGAN
*Director of the United States Patent and Trademark Office*